US009372672B1

(12) United States Patent
Thomas

(10) Patent No.: US 9,372,672 B1
(45) Date of Patent: Jun. 21, 2016

(54) TRANSLATION IN VISUAL CONTEXT

(71) Applicant: Vicki Thomas, Oakland, CA (US)

(72) Inventor: Vicki Thomas, Oakland, CA (US)

(73) Assignee: TG, LLC, Emeryville, CA (US)

( * ) Notice: Subject to any disclaimer, the term of this patent is extended or adjusted under 35 U.S.C. 154(b) by 0 days.

(21) Appl. No.: 14/477,838

(22) Filed: Sep. 4, 2014

Related U.S. Application Data

(60) Provisional application No. 61/873,616, filed on Sep. 4, 2013.

(51) Int. Cl.
*G06F 9/45* (2006.01)
*G06F 9/44* (2006.01)

(52) U.S. Cl.
CPC ... *G06F 8/30* (2013.01); *G06F 8/40* (2013.01)

(58) Field of Classification Search
None
See application file for complete search history.

(56) References Cited

U.S. PATENT DOCUMENTS

| | | | | |
|---|---|---|---|---|
| 6,092,036 | A * | 7/2000 | Hamann | G06F 9/4448 704/7 |
| 6,275,978 | B1 * | 8/2001 | Bell | 717/143 |
| 6,466,900 | B1 * | 10/2002 | Lissauer et al. | 704/7 |
| 2001/0029455 | A1 * | 10/2001 | Chin | G06F 17/273 704/277 |
| 2003/0115552 | A1 * | 6/2003 | Jahnke | G06F 9/4448 715/201 |
| 2003/0126559 | A1 * | 7/2003 | Fuhrmann | 715/513 |
| 2003/0135358 | A1 * | 7/2003 | Lissauer et al. | 704/2 |
| 2004/0268306 | A1 * | 12/2004 | Cheng et al. | 717/114 |
| 2005/0060138 | A1 * | 3/2005 | Wang | G06F 3/018 704/1 |
| 2005/0075858 | A1 * | 4/2005 | Pournasseh | G06F 17/289 704/2 |
| 2005/0131672 | A1 * | 6/2005 | Dalal | G06F 17/28 704/2 |
| 2005/0267733 | A1 * | 12/2005 | Hueber et al. | 704/2 |
| 2005/0288920 | A1 * | 12/2005 | Green | G06F 17/2785 704/3 |
| 2006/0100853 | A1 * | 5/2006 | McEntee et al. | 704/9 |
| 2006/0130006 | A1 * | 6/2006 | Chitale | G06F 17/275 717/136 |
| 2006/0277029 | A1 * | 12/2006 | Green et al. | 704/4 |
| 2007/0244691 | A1 * | 10/2007 | Alwan | G06F 17/2276 704/8 |
| 2007/0282594 | A1 * | 12/2007 | Spina | 704/9 |
| 2008/0133216 | A1 * | 6/2008 | Togami | 704/4 |
| 2009/0192783 | A1 * | 7/2009 | Jurach et al. | 704/4 |
| 2009/0276206 | A1 * | 11/2009 | Fitzpatrick | G06F 17/28 704/2 |
| 2009/0326911 | A1 * | 12/2009 | Menezes et al. | 704/2 |
| 2010/0082324 | A1 * | 4/2010 | Itagaki | G06F 17/2836 704/2 |
| 2010/0088695 | A1 * | 4/2010 | Kakinari | G06F 9/4448 717/178 |

(Continued)

*Primary Examiner* — Isaac T Tecklu

(57) ABSTRACT

Techniques that enable relatively easier translation of programs by translators, without requiring undue disclosure of information about the program. A translation assistant provides a model of the program instructions, for the translator to view the screen elements and translate them in context, without seeing the program code. The programmer and the translation assistant, working together, capture screen images to be reviewed by the translator, which provide context for translation. The translation assistant intercepts coded instructions to write to the screen when the program is in use. The intercepted instructions are logged and converted to descriptions in a screen-presentation language. The screen-presentation language is sent to the translator, who can edit the text of the wording on-screen, without seeing the underlying program code. An alternative communication line can be established between the programmer and the translator, for questions about intended meaning.

18 Claims, 3 Drawing Sheets

(56) References Cited

U.S. PATENT DOCUMENTS

| | | | |
|---|---|---|---|
| 2010/0161311 A1* | 6/2010 | Massuh | 704/7 |
| 2010/0299131 A1* | 11/2010 | Lanham et al. | 704/2 |
| 2011/0077935 A1* | 3/2011 | Viswanadha | G06F 17/30899 704/7 |
| 2011/0126098 A1* | 5/2011 | Jellison Jr. | G06F 9/4448 715/703 |
| 2012/0016655 A1* | 1/2012 | Travieso | G06F 17/2827 704/2 |
| 2013/0006603 A1* | 1/2013 | Zavatone | G06F 17/289 704/2 |
| 2013/0030789 A1* | 1/2013 | Dalce | 704/2 |
| 2013/0103383 A1* | 4/2013 | Du et al. | 704/3 |
| 2013/0138421 A1* | 5/2013 | Moulder | G06F 17/28 704/3 |
| 2013/0144596 A1* | 6/2013 | Lui et al. | 704/2 |
| 2013/0253901 A1* | 9/2013 | Krack | G06F 17/289 704/2 |
| 2013/0325435 A1* | 12/2013 | Hawkins et al. | 704/8 |
| 2014/0122054 A1* | 5/2014 | Takano | G06F 9/4448 704/2 |
| 2014/0214399 A1* | 7/2014 | Gulwani et al. | 704/8 |
| 2014/0249797 A1* | 9/2014 | Liu et al. | 704/2 |
| 2014/0278347 A1* | 9/2014 | Luo et al. | 704/3 |
| 2015/0046145 A1* | 2/2015 | Hamahata | G06F 17/2881 704/2 |

* cited by examiner

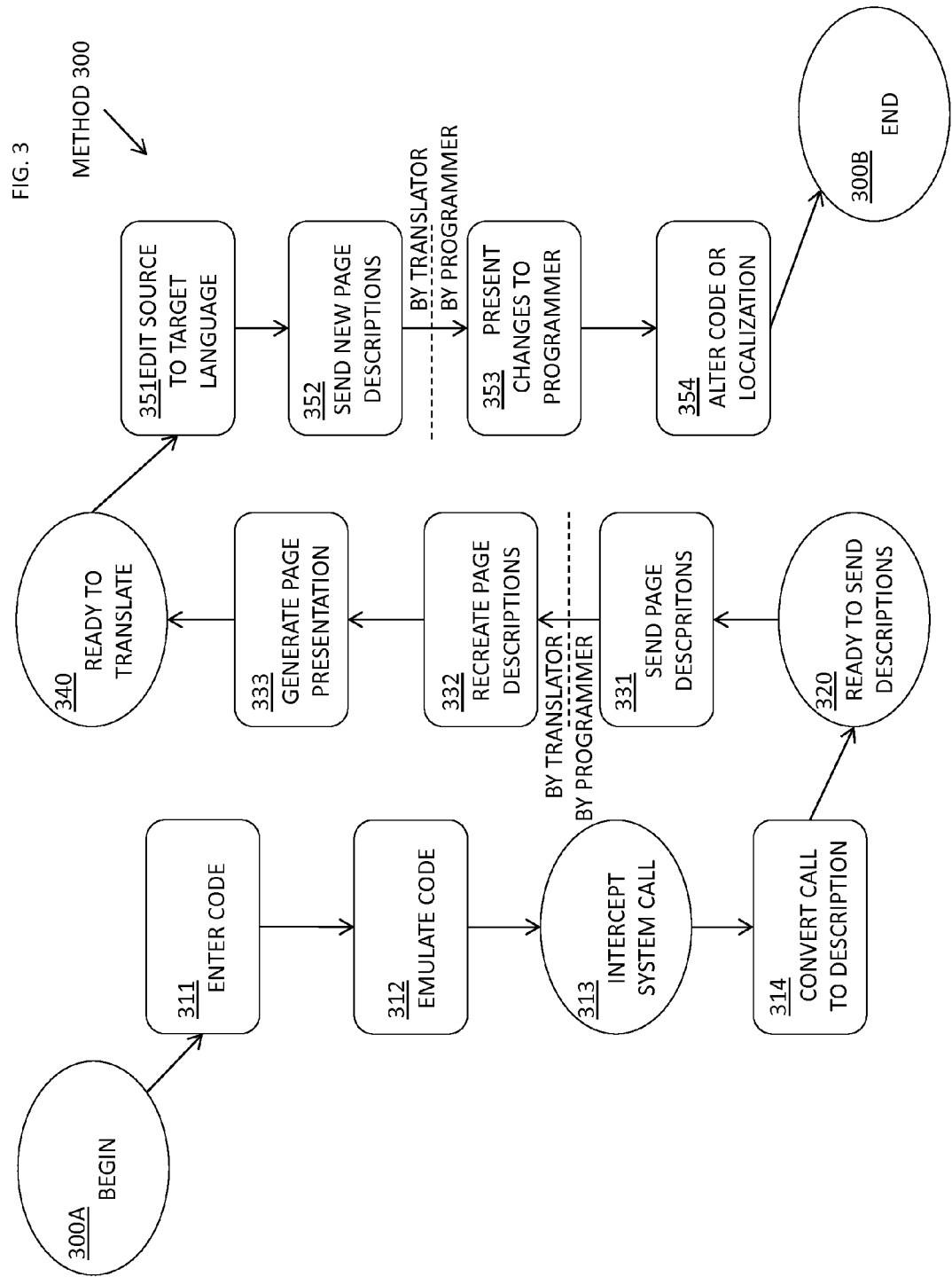

TRANSLATION IN VISUAL CONTEXT

BACKGROUND

1. Field of the Disclosure

This application generally relates to translation and other matters.

2. Background of the Disclosure

The computing power of hand-held (as well as wearable, implantable, and other) devices makes it possible to write programs of instructions for those devices that display information in various different ways. These can include text, drawings, still photos, animation, movies, and otherwise. Inclusion of text (or figures displaying text) can lead to the problem of a difference in meaning between what the programmer of the instructions intends that text to mean, and what the reader understands that text to mean. While this can occur for any written material, the problem is particularly acute when there is more than one (natural, human) language involved.

One known solution is to provide more than one variant of the text or figures displayed by the program (sometimes called an "application" or an "app"), such as an English version and a Spanish version. In such cases, the program could be written in a language most easily understood by the programmer, with values used by the program to display text or figures of meaning to the user. Some programs use a technique known as "localization", in which a single program can provide text and figures in multiple languages, as well as settings that determine what language to display the text, is collected in a standardized data structure. These settings can be fixed by the programmer, fixed at an initialization time by the program, or alterable by users from time to time. Other programs simply embed the text or figures as fixed constants in the instruction code, which is initially easier for the programmer, but can lead to greater difficulty when modifying or expanding the program later.

It sometimes occurs that translation of a snippet of text from one language to another can be very difficult. Often, the process requires a skilled translator, which can be expensive. Some languages have grammatical irregularities or idioms, and some words in some languages can acquire idiomatic or slang meanings, that would elude nearly everyone except those who are designing or using the program. Similarly, some words can have distinct meanings in different contexts, or multiple words can have the same or very similar meanings, again depending on context. For a first example, the English word hot can have at least four different meanings, each represented by a different Spanish word. For a second example, the English word charge can refer to a bank charge, a cavalry charge, a criminal charge, or an electrical charge, among other possibilities. It is quite possible that, in another language, each of these meanings will have a different word to express it.

One known solution is for the programmer to provide a list of textual words or phrases for the translator to convert into the other language. While this method can generally achieve the purpose of substituting one word for another, or one phrase for another, it is subject to some drawbacks. For example, since the programmer often does not have a working knowledge of the target language, it can sometimes occur that small changes to the program result in substantial changes in meaning of the translated version, which is generally undesirable.

One known solution is for the translator to be provided with a copy of the program, and examine that program for places where words should be translated from the source language to the target language. While this method can generally achieve the purpose of translating with the intent of the programmer in mind, it is subject to some drawbacks. A first drawback is that many programmers are reluctant to release their program instructions to another party, which poses difficulties in communication from the programmer to the translator. Even if the programmer provides a list of words and phrases to translate, along with screen shots of where those words and phrases are displayed, it might fail to be apparent to the translator just which words match which screen shots, and what specific meaning is intended by those words. A second drawback is that many translators are not well versed in programming, nor do they necessarily have the hardware and software for a development environment that might be needed to test their changes and make a quality translation. A third drawback is that some text within the program might include error messages or status messages for the programmer, and should not be translated.

Each of these examples, as well as other possible considerations, can cause difficulty in aspects of translating a program from one language to another (or even from one regional dialect of a language to another), no matter what type of computer that translation is for (that is, whether that program is operating on a mainframe, a minicomputer, a desktop computer, a laptop computer, a tablet computer or display, a hand-held computer or portable media device or telephone, a wearable computing device, an implantable computing device, or otherwise).

BRIEF SUMMARY OF THE DISCLOSURE

This application provides apparatuses and techniques that enable relatively easier translation of programs by translators, without requiring undue disclosure of information by the programmer, or undue special equipment by the translator, or other undue capabilities.

In one aspect this application describes, a translation assistant provides a model of the programmer's instructions, in a way that the translator need not have a sophisticated development environment, and need not view the programmer's instructions, for the translator to view the screen elements and translate them in context. For example, the programmer can provide a set of screen shots to be reviewed by the translator, which can, in addition to providing context, allows the translator to see that context without having to learn the operation of the program (and possibly without having to achieve the skill necessary to reach the "higher levels" of the program, such as when the latter is a skill-based game).

In this aspect, the application provides a technique by which the translator can edit the words displayed by the program, replacing source language words (such as English) with appropriate target language words (such as Spanish). As the translator can see the use of the source language in context, it is much more likely that the translator will be able to select a correct equivalent in the target language. By having the context of the entire screen, and possibly the entire sequence of screens, available, the translator can more easily distinguish between multiple meanings a source-language word might have, and can more easily select between multiple target-language words, each with a different possible shading of meaning, that might be usable. Moreover, the translator need not have any particular skill in the programmer's choice of coding language for instructions. In one embodiment, the translator can simply edit the words on screen.

In this aspect, the application provides a technique by which the translator's edits from source-language to target-language are returned to the programmer, such as in a standard internationalization data structure, or more simply as a list or spreadsheet of replacements of source-language phrases with target-language phrases in the order they were presented by the programmer. The translation assistant can either edit the programmer's coded instructions directly, or can provide a sequence of pointers to locations in those coded instructions, with the replacements of source-language phrases with target-language phrases.

In one aspect this application describes, an embodiment of the translation assistant is interpolated between the programmer and the translator, with the property that coded instructions in the program to write to the screen (when the program is in use) are intercepted. The intercepted instructions to write to the screen are replaced with instructions in a screen-presentation language, such as HTML or a variant thereof. The translator can see the screen presentation intended by the programmer without having the same development environment; the translator need use only a standard program for screen presentations using the screen-presentation language, possibly with relatively minor modification. In cases in which the screen-presentation language is HTML or a variant thereof, the translator needs only a modified web presentation client (sometimes known as a "web browser"), generally capable of being executed on almost any desktop or laptop computer, and many other devices as well. This allows the translator to work without any particular special hardware, and with only slightly modified software.

For a first example, the application can provide a technique by which the target-language text supplied by the translator can be matched to the source-language text from the programmer. This can be particularly rapid when the program uses standard localization techniques and a standard localization data structure.

For a second example, in this aspect, the application provides a technique by which the target-language text provided by the translator can be tested by the programmer. The programmer can alter the program to include the target-language text as an alternative to the source-language text, and provide the altered program to the translator for screen-by-screen comparison. This allows the translator to further check that the substitution of target-language phrases for source-language phrases is reasonable. An alternative communication line can be established between the programmer and the translator, when and if the translator has questions about the programmer's intended meaning.

In one aspect this application describes, an embodiment of the translation assistant can be interpolated between the programmer and the translator by emulating the program (possibly by using a slightly modified version of a relatively standard program emulator), and intercepting instructions in the program that cause the program to write to the (emulated) screen. When the translation assistant identifies an attempt by the program to write to the screen, the translation assistant can replace that attempt to write to the screen with one or more actions to write instructions a screen-presentation language, such as HTML or a variant thereof, as noted above.

For example, when the program writes a text string to the screen, the translation assistant, in the course of emulating the program, identifies the attempt by the program to write to the screen, and, instead of executing instructions in the program that write to the screen, executes instructions that write screen-presentation language (such as HTML or a variant thereof). This has the effect that, when the constructed screen-presentation language is sent to the translator, the translator's (modified) web browser can produce the same screen presentation as would have otherwise occurred had the program written directly to the translator's screen.

In this aspect, when the program writes a text string to the screen, the translator's (modified) web browser, in the course of rendering the screen-presentation language from the program to the translator, can allow the translator to edit the screen display, such as using a slightly modified standard editing program. For a first example, the translator's web browser can allow the translator to display the screen presentation from the program on a first screen, while allowing the translator to modify text or other language elements on a second screen. For a second example, the translator's web browser can allow the translator to directly edit the text in the screen-presentation language.

For example, when the program writes a text string to the screen, the translation assistant can isolate text or other language elements into a localization data structure automatically, and include data from at least a portion of that localization data structure (possibly in another format) in the screen-presentation language sent to the translator. The translator's (modified) web browser can, in response to modifications by the translator, add to or modify that localization data, already including information about the source language, with information regarding the target language. The translator's (modified) web browser can send this modified localization data back to the programmer for incorporation into the program, with the effect of providing a version of the program that also is able to operate using the target language.

In one aspect this application describes, an embodiment of the translation assistant can be interpolated between the programmer and the translator by emulating one or more other types of activities, such as presenting still pictures, animation, video, sound, or otherwise. Similarly, in this aspect, an embodiment of the translation assistant can be used to translate from other than a source-language to a target-language. For a first example, the translation assistant can be used to translate from a relatively higher grade reading level to a relatively lower grade reading level, so as to make written material available to a wider audience. For a second example, the translation assistant can be used to translate from a set of parentally-controlled words to a set of child-appropriate words.

After reading this application, those skilled in the art would recognize that techniques shown in this application are applicable to more than just the specific embodiments shown herein. For a first example, human translation could be replaced or augmented with translation including more than one level of review. For a second example, human translation could be replaced or augmented with machine translation followed by review by human translation. For a third example, translation could be replaced or augmented with translation of gestures or facial expressions. For a fourth example, translation could be replaced or augmented with changes to the style of writing, such as rewriting the novels of Jane Austen in the style of H. P. Lovecraft.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

FIG. 3 shows a conceptual drawing of a method.

DETAILED DESCRIPTION

Translation System

Figure 1:
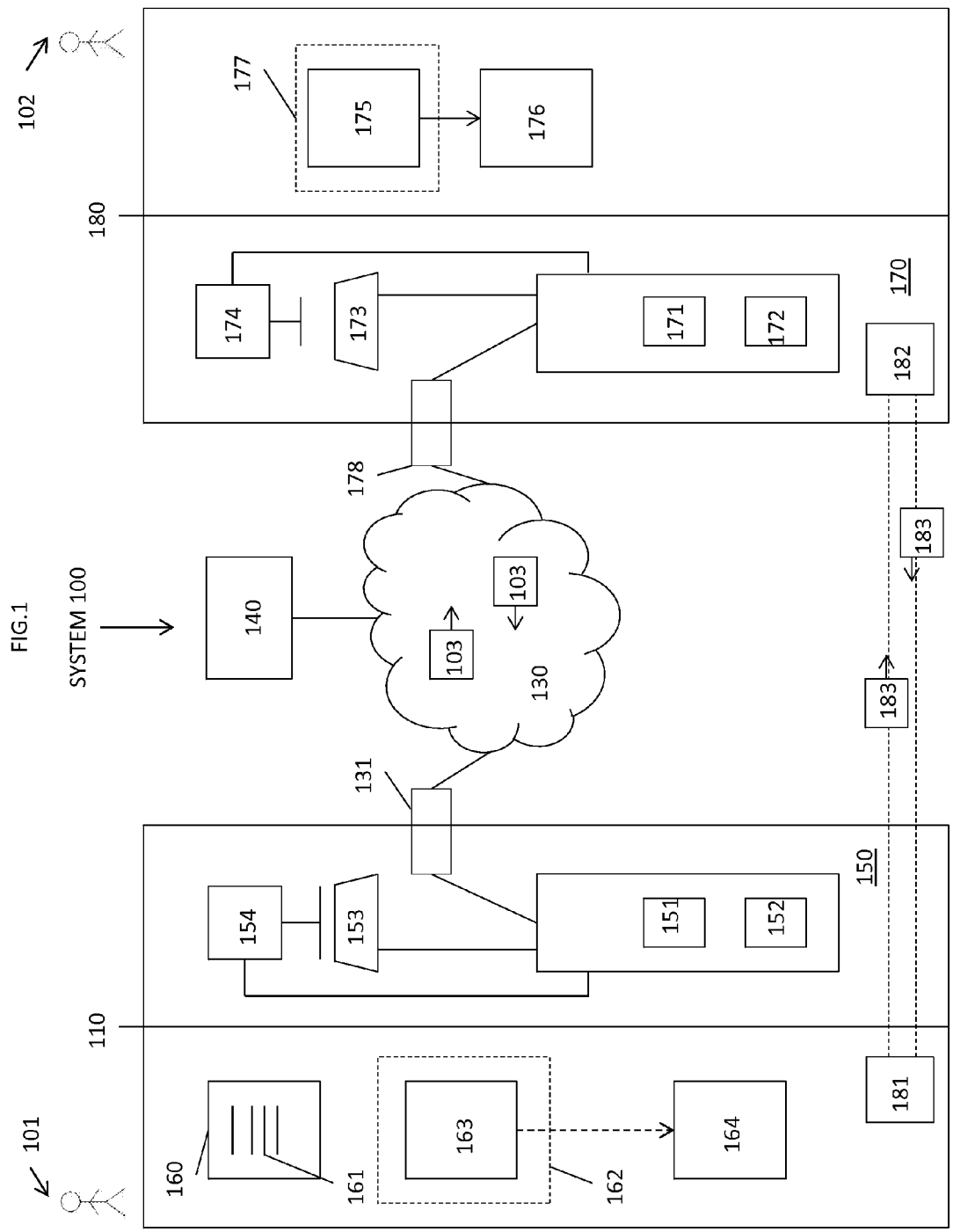
FIG. 1 shows a first conceptual drawing of a system.

FIG. 1 shows a first conceptual drawing of a system.

Programmer Workstation.

A system 100 includes elements shown in the figure, including at least a programmer workstation 110 disposed to be used by a programmer 101 or other user, a translator workstation 120 disposed to be used by a translator 102 or other user, and one or more communication links 130 disposed to carry messages 103 to and fro between the programmer workstation 110 and the translator workstation 120. The system 100 can also include other elements, whether or not shown in the figure, otherwise mentioned herein, or otherwise known in the art. For example, the system 100 can include a monitoring workstation 140 disposed to monitor operation of the system 100, and (optionally) to accept commands from, and provide responses to, one or more network operators or remote devices.

The programmer workstation 110 can be disposed for operation by one or more programmers 101 or other users, such as programmers, software designers, graphic artists, operators, other individuals or collections of people (whether operating locally or remotely), or by other automated devices or programs suited for controlling the programmer workstation 110. The programmer workstation 110 can include a programmer computing device 150, such as one including a processor 151, memory or mass storage 152 maintaining instructions and data, one or more input elements 153, and one or more output elements 154. The computing device 150 can also include other elements, whether or not shown in the figure, otherwise mentioned herein, or otherwise known in the art.

The input elements 153 can include one or more keyboards, mice or other pointing devices or pressure elements, touchpads, or other devices, such as devices capable of recognizing facial expressions, fingerprints, gestures, speech, or other possible inputs. The output elements 154 can include one or more displays or monitors, lamps, speakers, touchpads, or other devices, such as devices capable of presenting electrical, haptic, olfactory, or other possible outputs.

The programmer workstation 110 can include a copy of the program 160, including a copy of its instructions 161, an emulator 162 presenting the instructions 161 with a virtual copy of a hand-held device or other device on which those instructions 161 are disposed to be executed (such as an iPhone™, iPad™, or Google Glass™), and one or more programmer representations 163 of one or more screen views presented by the instructions 161 when those instructions 161 are executed. The programmer workstation 110 can also include one or more alternative programmer representations 164 of one or more screen views that would be presented by the instructions 161 when those instructions 161 are executed, if those instructions 161 were to make their presentation in another (natural, human) language.

Modified Library.

The instructions 161 can include one or more program instruction libraries, which can be called upon by the program to perform standard functions, such as writing to the display or screen (or other attempts by the app to change the screen image). In some embodiments, the library including the screen-writing function is protected from program trickery by the operating system, while in other embodiments, that library can be exposed to manipulation by the programmer using the instructions 161. In either case, the library can be modified to include a modified screen-writing function, as described herein.

Each time one of these intercepted functions is called, the modified program libraries capture the content of the (emulated) screen, which includes all information describing how text appears on the screen, and which includes all information describing what text that is. For example, if the app writes a speech balloon on the screen, and inside that speech balloon writes the English word "hot!", the modified emulator 162 captures that information, including the background color, border color and thickness, location, shape, size, and other features of the speech balloon, and the font, position, punctuation, size, text, and other features of the words written in the speech balloon.

Each time the modified program libraries capture information about modifications to the screen, the modified program libraries generate a description of the screen, in a comparatively simple page description language. The page description language can include HTML or a variant thereof. The page description language can be selected to be simple enough that a relatively simple program (compared to the programmer's coding environment for computer-readable language) can render an exact copy of the screen that would have been generated by the app if it were actually being executed on a hand-held device such as an iPhone™ or iPad™, or a wearable device such as Google Glass™ or an iWatch™

This can have the effect that each time the screen is changed by the (emulated) app, the program libraries generate a description of the new screen, in the page description language. This can have the effect that the page description language can be sent to the translator workstation 120, which can render a substantially exact copy of the screen image, without having to include any copies of the programmer's coding language environment, or any copies of the programmer's actual instructions 161 that generate that screen image, as described herein. This can also have the effect that the translator workstation 120 can include relatively inexpensive hardware and software, since it does not have to include the programmer's coding language environment or the modified program libraries.

Alternative: Modified Emulator.

The emulator 162 can include a standard emulator for such programs 160, such as the emulator supplied by Apple, Inc. for emulating an app (a program 160) to execute under control of the iOS™ operating system on hand-held devices such as the iPhone™ and iPad™, or an emulator provided by another source. In alternative embodiments, the program instruction libraries are not necessarily modified, but instead, the emulator 162 itself can be modified, in lieu of or in addition to, modifications to the program instruction libraries. The (modified) emulator 162 can include a modification to one of those standard emulators, which differs by intercepting attempts by the app to change the screen image. For example, the modified emulator 162 can intercept the functions for string-lookup and for writing text to the screen, similar to described above regarding the program libraries.

In such alternative embodiments, similarly, each time one of these intercepted functions is called, the modified emulator 162 captures the content of the (emulated) screen, which includes all information describing how text appears on the screen, and which includes all information describing what text that is. Again, for example, if the app writes a speech balloon on the screen, and inside that speech balloon writes the English word "hot!", the modified emulator 162 captures that information, including the background color, border color and thickness, location, shape, size, and other features of the speech balloon, and the font, position, punctuation, size, text, and other features of the words written in the speech balloon.

In such alternative embodiments, similarly, each time the modified emulator 162 captures information about modifications to the screen, the modified emulator 162 generates a description of the screen, in a comparatively simple page description language. Similar to as noted above, the page description language can include HTML or a variant thereof. Also similar to noted above, the page description language can be selected to be simple enough that a relatively simple program (compared to the programmer's coding language environment) can render an exact copy of the screen that would have been generated by the app if it were actually being executed on a hand-held device such as an iPhone™ or iPad™

Similar to as described above, this can have the effect that each time the screen is changed by the (emulated) app, the modified emulator 162 generates a description of the new screen, in the page description language. Also similarly, this can have the effect that the page description language can be sent to the translator workstation 120, which can render a substantially exact copy of the screen image, without having to include any copies of the programmer's coding language environment, or any copies of the programmer's actual instructions 161 that generate that screen image, as described herein. Also similarly, this can also have the effect that the translator workstation 120 can include relatively inexpensive hardware and software, since it does not have to include the programmer's coding language environment or the modified emulator 162.

Translator Workstation.

Similarly, the translator workstation 120 can be disposed for operation by one or more translators 102, or such as translator assistants, reviewers, other individuals or collections of people (whether operating locally or remotely), or by other automated devices or programs suited for controlling the translator workstation 120. Similar to the programmer workstation 110, the translator workstation 120 can include a translator computing device 170, such as one including a processor 171, memory or mass storage 172 maintaining instructions and data, one or more input elements 173, and one or more output elements 174. The one or more input elements 173 can include devices similar to the one or more input devices 153, and the one or more output devices 174 can include devices similar to the one or more output devices 154. Similarly, the second computing device 170 can also include other elements, whether or not shown in the figure, otherwise mentioned herein, or otherwise known in the art.

Similarly, the translator workstation 120 can include one or more translator representations 175 of one or more screen views presented by the translator computing device 170 when that device is operated on the page description language. Similarly, the translator workstation 120 can also include one or more alternative translator representations 176 of one or more screen views presented by the translator computing device 170 when that device is operated on the page description language, if the text and wording for the representation in the page description language were to make their presentation in another (natural, human) language.

Modified Renderer.

The translator workstation 120 can include a page renderer 177, such as any of the web browsers Chrome™ by Google, Inc., Firefox™ by the Mozilla Foundation, or Safari™ by Apple, Inc. The translator 102 can use the renderer 177 in combination with a form-filling program, which can, as described herein, allow the translator 102 to identify word or phrases, or images, and indicate translations thereof.

This can have the effect that the translator 102 can alter the words in the screen image from the source language (such as English) to the target language (such as Spanish). The renderer 177 can allow the translator 102 to see the effects of their translation on the screen image. The renderer 177 can also allow the translator 102 to page back and forth among the screen images generated by the program 160 in the order they were generated.

Each time the translator 102 indicates a translated word or phrase, or image, the renderer 177 can generate a description of a modified screen image, such as in the page description language. Alternatively, the renderer 177 may generate a description in some other description language sufficient to describe the changes, or to describe the new screen. The renderer 177 can generate a separate version of the screen showing the changes, while preserving the original version of the screen. Alternatively, the renderer 177 may allow the translator 102 to make the changes directly on the version of the screen image that it was sent.

The translator workstation 120 can send one or more messages 103 to the programmer workstation 110, describing the changes made by the translator 102. The translator workstation 120 may send these messages in real time, as the translator 102 makes the changes, or can wait until the translator 102 directs the translator workstation 120 to send the changed screen images to the programmer workstation 110. The programmer workstation 110 can either (A) show the changes to the programmer 101, allowing the programmer 101 to modify the program 160 as desired, or (B) modify the program 160 automatically. For example, if the program 160 includes a standard localization resource, the programmer workstation 110 can add the translator's changes as a new localization.

Communication.

The programmer workstation 110 can also be disposed for control of a programmer communication interface 131, such as a network interface card (NIC) coupled to the communication link 13o and controlled by the processor 151. The communication link 13o can include a switched connection, such as a satellite link or a telephone line, or can include a networked connection, such as a computer network (whether a LAN, WAN, or other type of network), or can provide another form of communication to and fro between the programmer workstation 110 and the translator workstation 120.

The programmer workstation 110 can send messages 103 to the translator workstation 120 and receive messages 103 from the translator workstation 120, such as messages in a communication protocol described herein (or another communication protocol), using the programmer communication interface 131. The programmer workstation no can construct those messages 103 to include information describing those one or more representations 163 of screen views that would be presented by the instructions 161 when those instructions 161 are executed. The programmer workstation 110 can send those messages 103, using the communication interface 131 and the communication link 130, to the translator workstation 120, which can receive those messages 103.

Similarly, the translator workstation 120 can also be disposed for control of a translator communication interface 178, such as a network interface card (NIC) coupled to the communication link 13o and controlled by a processor at the translator workstation 120. The translator workstation 120 can receive messages 103 from the programmer workstation 110 and send messages 103 to the programmer workstation 120, such as messages in the communication protocol described herein (or another communication protocol), using the translator communication interface 178.

Alternatively, the programmer 101 and the translator 102 may also communicate using alternative techniques. For example, the programmer 101 and the translator 102 may exchange information using a telephone connection, email, instant messaging, SMS and MMS messages, videoconferencing, or otherwise. The translator 102 might telephone the programmer 101 to ask for the intended meaning of an ambiguous word or phrase.

Alternative Messaging.

The programmer workstation 110, translator workstation 120, and communication link 13o can facilitate communication between the programmer 101 and the translator 102 by providing a programmer messaging window 181 that can be shown at the programmer workstation 110, a translator messaging window 182 that can be shown at the translator workstation 120, and a type of "direct communication" message 183 that can be sent using the communication link 13o to or fro between the programmer workstation 110 and the translator workstation 120. The programmer messaging window 181 and the translator messaging window 182 can be used to send text, sound, video, or other types of information.

User Interfaces

Figure 2:
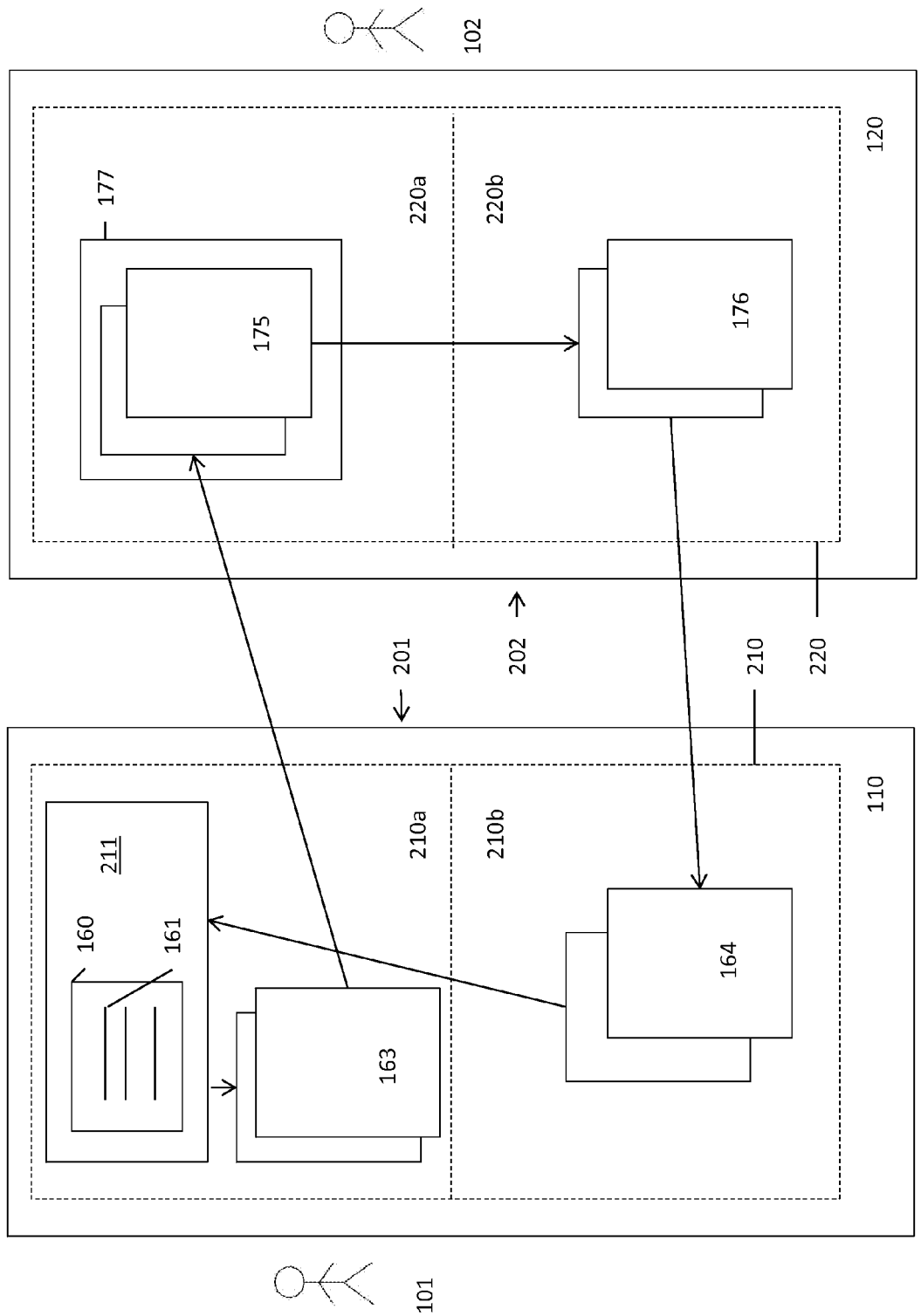
FIG. 2 shows a second conceptual drawing of a system.

FIG. 2 shows a second conceptual drawing of a system.

The programmer workstation 110 can be disposed to present a programmer user interface (UI) 201. The programmer 101 can use the programmer UI 201 to interact with the system 100. The translator workstation 120 can be disposed to present a translator UI 202. The translator 102 can use the translator UI 202 to interact with the system 100. As described herein, the programmer 101 can use the programmer UI 201, and the translator 102 can use the translator UI 202 to interact with each other more directly.

Programmer UI.

The programmer UI 201 includes a programmer display 210, which can include a first portion 210a and a second portion 210b. There is no particular requirement that the first portion 210a and the second portion 210b are in separate parts of the programmer display 210. For example, the programmer UI 201 can include elements described herein as the first portion 210a and elements described herein as the second portion 210b can be intermixed and, where practical, overlapping.

The first portion 210a can include a presentation of an integrated development environment (IDE) 211. The IDE 211 can include a presentation of the program 160, including a set (or subset) of the program's instructions 161, and one or more of the programmer representations 163 of one or more screen views presented by the instructions 161 when those instructions 161 are executed. This has the effect that the programmer 101 can see the changes in screen images that would be presented in response to changes in the program 160.

The second portion 210b of the programmer display 210 can include the alternative programmer representations 164 (in the target language) of one or more screen views, each having a corresponding one of the programmer representations 163 (in the source language). The alternative programmer representations 164 are responsive to actions by the translator 102, as described herein. The alternative programmer representations 164 represent the screen images that would be presented by the instructions 161 when those instructions 161 are executed, if those instructions 161 were to make their presentation in the target language (as indicated by the translator 102). This can have the effect that the programmer 101 can see the screen images that would be presented in each language, concurrently, using the programmer representation 163 and the alternative programmer representation 164. This can have the effect that the programmer 101 can see if the screen images differ so much in presentation that the translation afforded by the alternative programmer representation 164 might need alteration, and can communicate that information to the translator 102.

Translator UI.

Similarly, the translator UI 202 includes a translator display 220, which can include a first portion 220a and a second portion 220b. Similarly, there is no particular requirement that the first portion 220a and the second portion 22ob are in separate parts of the programmer display 220. For example, the translator UI 202 can include elements described herein as the first portion 220a and elements described herein as the second portion 220b that can be intermixed and, where practical, overlapped.

Similarly, the first portion 220a can include the one or more translator presentations 175 of one or more of the screen views presented by the renderer 177. As described herein, each one of the translator presentations 175 is constructed by the renderer 177 in response to the page description language version of the corresponding screen view.

Similarly, the second portion 220b can include one or more alternative translator presentations 176 of one or more of the screen views presented by the renderer 177. As described herein, the alternative translator presentations 176 include screen elements from one or more of the screen views presented by the renderer 177, but with words or phrases in the target language substituted for corresponding words or phrases from the source language.

When the page description language is HTML or a variant thereof, the translator 102 can edit the text identified by the page description language using a relatively simple "form" editor, in which the translator can fill in the blanks each associated with a translatable word or phrase, or image. In alternative embodiments, the translator workstation 120 can include a standard or nonstandard HTML editor, or a modification or variant thereof. For example, the translator workstation 120 can include a standard HTML editor, modified so that changes made by the translator 102 to one or more of the translator presentations 175 are reflected, not in the translator presentations 175 themselves, but each in their corresponding alternative translator presentations 176. This has the effect that the translator 102 can see both the translator presentations 175 (in the source language) and the corresponding alternative translator presentations 176 (in the target language) concurrently. Alternatively, the editor may also be modified to indicate to the translator which text strings in the translator presentations 175 have not yet been translated, such as by showing them in red or showing outlined blank spots in the corresponding alternative translator presentations 176.

Interaction Between Programmer and Translator.

As described herein, when the translator 102 makes changes to one or more of the translator presentations 175 (in the source language), which are reflected in the corresponding alternative translator presentations 176 (in the target language), those changes can be seen by the programmer 101 at the programmer's workstation 110 in the second portion 210b thereof, as one or more changes between one or more of the programmer representation 163 (in the source language) and their corresponding alternative programmer representation 164 (in the target language).

When the programmer 101 makes changes to the program 160, those changes cause consequent changes in one or more of the programmer representations 163 (in the source language). This has the effect of causing changes in the corresponding translator representations 175 (in the source language). When the translator 102 performs their translation, that translation cause changes in one or more of the alternative programmer representations 164 (in the target language).

This would occur in embodiments in which the programmer 101 was presented with those changes and they were not automatically made to the localization portion of the program 160. Even in embodiments in which the translator's changes actually were automatically made to the localization portion of the program 160, the programmer 101 can be presented with a visualization of those changes using one or more of the alternative programmer representations 164.

This has the effect that the programmer 101 and the translator 102 can communicate indirectly. The programmer 101 can send information to the translator 102 by making changes to the program 160, which has the effect of making changes to one or more of the programmer representations 163 (in the source language). This has the effect of making changes to the translator presentations 175 (in the source language), which the translator 102 can see. Similarly, the translator 102 can send information to the programmer 101 by making changes to one or more of the alternative translator presentations 176 (in the target language), which has the effect of making changes to the corresponding alternative programmer representations 164 (in the target language).

Alternatively, the programmer 101 and the translator 102 can communicate directly, such as either (A) facilitated by the system, as described herein, or (B) using another communication technique, such as a telephone call or other person-to-person communication technique. This has the effect that the translator 102 can ask the programmer 101 for the intended meaning of any ambiguous words or phrases, and can make an appropriate translation.

Method of Using Translation System

FIG. 3 shows a conceptual drawing of a method.

A method 300 can be performed by the system 100, the programmer 101, the translator 102, or combinations thereof. Where described herein that a step is performed by the method 300, it should be understood from context (or from the figure) which portion of the system 100, or alternatively the programmer 101 or the translator 102, takes the specific actions described for that step.

Although the steps are shown in a particular order, in the context of the invention, there is no reason for any such limitation. The steps may be performed in a different order, or may be performed in a parallel or pipelined manner, or otherwise.

Beginning of Method.

A flow point 300A indicates a beginning of the method 300.

Modified Program Libraries or Emulation.

At a step 311, the programmer 101 enters instructions 161 in the coding (computer-readable) language environment for the program 160. The programmer workstation 110 can show the instructions 161 to the programmer 101 in a format that allows for ease of code construction, ease of editing, ease of detecting errors, or other factors.

At a step 312, the programmer 101 directs the coding language environment to execute the app, or a portion thereof. As a part of this step, any time the app attempts to change the screen image, such as by writing text or images to the screen, that attempt by the app can be intercepted by the modified program libraries (in one embodiment) or modified emulator 162 (in alternative embodiments).

At a step 313, the modified program libraries (or modified emulator 162) intercept a system call from the program 160, directing the target device (that is, the device with which the program 160 is intended to be used) to alter its screen display. The modified program libraries (or modified emulator 162) can present one or more of the programmer representations 163 (in the "source language", the original human, natural language), with the effect that the programmer 101 can see what one or more of the screen images will look like on the target device. The programmer workstation 110 can present the programmer representations 163 to the programmer 101 one at a time, two or more at a time, or all at once. The programmer workstation 120 can select among these choices at the direction of the programmer 101, or in response to other factors.

At a step 314, the modified program libraries (or modified emulator 162) translate the system call from the program 160 into a change in the page description (using the page description language) of the screen image that would be presented by the program 160 on the target device. For example, when the page description language includes HTML or a variant thereof, the modified emulator 162 can edit the HTML markup so that the page description matches the changed screen image.

At a flow point 320, the programmer workstation 110 has translated operation of the program into one or more page descriptions of screen images that would be presented on the target device by the program 160. The method 300 is ready to send those one or more page descriptions to the translator 102.

Page Sent to Translator.

At a step 331, the programmer workstation 110 sends the one or more page descriptions of screen images to the translator workstation 120, using the one or more communication links 130. To perform this step, the programmer workstation 110, the translator workstation 120, and the one or more communication links 130 can use a standard page description transmission protocol, such as HTTP or a variant thereof.

Although this step, and other communication steps between the programmer workstation 110 and the translator workstation 120 described herein, is described as including direct communication, in one embodiment, an intermediary server (not shown) is included in the steps of communication. For example, in one embodiment, the programmer workstation 110 can send a message to the translator workstation 120 using a $1^{st}$ sub-step of sending that message to the intermediary server, which can store that message for later retrieval. At another time, the translator workstation 120 can receive that message from the programmer workstation 110 by retrieving that message from the intermediary server using a $2^{nd}$ sub-step, which can then either delete the message, or archive it for later processing.

In one embodiment, either or both of the $1^{st}$ sub-step and the $2^{nd}$ sub-step can include use of a protocol for transmitting information, such as the HTTP protocol or a variant thereof. However, there is no requirement for any such limitation; any communication protocol can be used. Moreover, in one embodiment, either or both of the $1^{st}$ sub-step and the $2^{nd}$ sub-step can include a client-server model of interaction, such as either or both of the programmer workstation 110 and the translator workstation 120 sending requests to the intermediary server and receiving responses thereto. However, there is no requirement for any such limitation; any model of interaction can be used.

In alternative embodiments, the intermediary server can be replaced with more than one such intermediary server, such as if communication between the programmer workstation 110 and the translator workstation 120 is desired to be load-shared among multiple devices, or desire redundancy. Moreover, in other alternative embodiments, the intermediary server can be eliminated, such as if communication between the programmer workstation 110 and the translator workstation 120 is desired to be direct and without intermediaries. These preferred and alternative techniques of communication can be used, in whole or in part, wherever communication is described herein.

At a step 332, the translator workstation 120 receives the one or more page descriptions of screen images that would be presented on the target device by the program 160.

At a step 333, the renderer 177 responds to the one or more page descriptions, with the effect of generating one or more of the translator presentations 175 (in the source language). The translator workstation 120 can present the translator presentations 175 to the translator 102 one at a time, two or more at a time, or all at once. The translator workstation 120 can select among these choices at the direction of the translator 102, or in response to other factors, such as the screen size at the translator workstation 120.

Similarly, the first portion 220a can include the one or more translator presentations 175 of one or more of the screen views presented by the renderer 177. As described herein, each one of the translator presentations 175 is constructed by the renderer 177.

Translation.

At a flow point 340, the translator 102 can see the one or more of the translator presentations 175 (in the source language) of the screen images. The translator 102 can see the context in which the source language is used, and can determine an appropriate translation thereof.

At a step 351, the translator 102 edits the translator presentations 175 (in the source language) using the renderer 177. The changes can be shown in the alternative translator presentations 176 (in the target language). Alternatively, the changes can be shown in the translator presentations 175, with the effect that the translator presentations 175 are changed from the source language to the target language. In one embodiment, a machine translation (using known machine translation techniques) can be used to perform part or all of the initial translation, and the translator 102 can be provided with the machine translations and given the opportunity to correct them or polish them. In alternative embodiments, the machine translation is optional.

At a step 352, the translator workstation 120 sends the page descriptions of the alternative translator presentations 176, that is, after they have been translated, to the programmer workstation 110. To perform this step, the programmer workstation 110, the translator workstation 120, and the one or more communication links 130 can use a standard page description transmission protocol, such as HTTP or a variant thereof.

At a step 353, the programmer workstation 110 presents the alternative translator presentations 176 (in the target language) to the programmer 101.

At a step 354, the programmer 101 makes any desired changes to the instructions 101 in the program 120, using the programmer workstation 110.

End of Method.

A flow point 300B indicates an end of the method 300. The method 300 repeats until both the programmer 101 and the translator 102 are satisfied with the result. Alternatively, the method 300 may repeat until some selected condition occurs.

Alternative Embodiments

Elements of the system are described herein with respect to one or more possible embodiments, and are not intended to be limiting in any way. In the context of the invention, there is the particular requirement for any such limitations as described with respect to any elements of the system. For example, individual elements of the system 100 could be replaced with substitutes that perform similar functions. Moreover, as described herein, many individual elements of the system are optional, and are not required for operation.

Although the one or more control elements of the system are described herein as being executed as if on a single computing device, in the context of the invention, there is no particular requirement for any such limitation. For example, the one or more control elements of the system can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. A system including
   a first computing device including an emulator for an application, the application suitable for operation on a mobile device and disposed to provide screen output to a user in a first natural language, the screen output represented within the emulator using a data structure suitable for developing the application by a first person;
   a first screen output descriptor, the first screen output descriptor capable of being executed or interpreted within the emulator, and capable of transforming the data structure to a markup language;
   the markup language including a description of each screen output provided to the user, in the first natural language, by the application;
   a second computing device, capable of presenting a visual image of each screen output in response to the markup language, in a human-readable format, without needing an ability to develop the application, the second computing device being capable of receiving alternative visual images of each screen output from a second person;

the second computing device capable of receiving the markup language from the first computing device, and capable of sending the alternative visual images to the first computing device;

a second screen output descriptor, the second screen output descriptor capable of transforming the alternative visual images to an alternative data structure, the application being capable of using the alternative data structure to present alternative screen output to the user in a second natural language.

2. A system as in claim 1, including an automated application editor, capable of altering the application in response to the alternative visual images, and capable of causing the application, in response to execution or interpretation on the mobile device, to present screen shots to the user in a second natural language.

3. A system as in claim 2, wherein the automated application editor, in response to the alternative visual images, alters the data structure to include information suitable to cause the application, in response to execution or interpretation on the mobile device, to present screen shots to the user in the second natural language.

4. A system as in claim 2, wherein the automated application editor, in response to the alternative visual images, appends a localization data structure to the application;

wherein the application, in response to execution or interpretation on the mobile device, presents screen shots to the user in the second natural language.

5. A system as in claim 1, wherein the second computing device, in response to the second person, transforms the alternative visual images into a set of alternative versions of the markup language, the alternative versions of the markup language including a description of each screen output provided to the user by the application, in the second natural language.

6. A system as in claim 5, wherein the automated application editor, in response to the alternative versions of the markup language, is capable of causing the application, in response to execution or interpretation on the mobile device, to present screen shots to the user in the second natural language.

7. A system as in claim 5, wherein the automated application editor, in response to the alternative versions of the markup language, alters the data structure to include information suitable to cause the application, in response to execution or interpretation on the mobile device, to present screen shots to the user in the second natural language.

8. A system as in claim 5, wherein the automated application editor, in response to the alternative versions of the markup language, appends a localization data structure to the application;

wherein the application, in response to execution or interpretation on the mobile device, presents screen shots to the user in the second natural language.

9. A system as in claim 1, including a communication path between the first person and the second person, the communication path providing an opportunity for the second person to request information from the first person about one or more of the screen shots, and the communication path providing an opportunity for the first person to provide the information in response to the request.

10. A system as in claim 9, wherein the request for information from the second person includes a request for clarification of a natural-language meaning of a portion of the markup language.

11. A system as in claim 9, wherein the request for information from the second person includes two or more alternative natural-language meanings for a portion of the markup language.

12. A system as in claim 9, wherein the request for information from the second person includes a description of two or more natural-language meanings having distinct alternative visual images representative of a portion of at least one screen output; and the information from the first person includes description of one or more natural-language meanings representative of the screen output from the application.

13. A system as in claim 1, wherein the screen output represented within the emulator includes one or more of: natural languages, regional dialects of natural languages, distinct reading grade levels, parentally-controlled words, distinct stylistic versions of writing in natural languages.

14. A system as in claim 1, including a third computing device, capable of receiving the screen output from the emulator for the application, the third computing device including instructions executable or interpretable in response to the screen output, capable of sending the screen output to the second computing device in the markup language, and capable of receiving the alternative markup language from the second computing device;

wherein the third computing device includes instructions executable or interpretable in response to the alternative markup language, capable of altering the application at the first computing device in response to the alternative markup language.

15. A system as in claim 1, including a third computing device, capable of receiving the screen output from the emulator for the application, the third computing device including instructions executable or interpretable in response to the screen output, capable of sending the screen output to the second computing device in the markup language, and capable of receiving the alternative markup language from the second computing device;

wherein the third computing device includes instructions executable or interpretable in response to the alternative markup language, capable of appending a localization data structure to the application;

wherein the application, in response to execution or interpretation on the mobile device, presents screen shots to the user in the second natural language.

16. A system as in claim 2, wherein the application as altered in response to the automated application editor, is not fixed by the first person, is not fixed at an initialization time of the application, and is not alterable more than once by a user of the application.

17. A system as in claim 3, wherein the data structure as altered in response to the automated application editor, is not fixed by the first person, is not fixed at an initialization time of the application, and is not alterable more than once by a user of the application.

18. A system as in claim 4, wherein
the localization data structure as altered in response to the automated application editor, is not fixed by the first person, is not fixed at an initialization time of the application, and is not alterable more than once by a user of the application.

\* \* \* \* \*